No. 809,331. PATENTED JAN. 9, 1906.
M. G. DE SIMONE.
CLUTCH MECHANISM.
APPLICATION FILED APR. 14, 1905.

3 SHEETS—SHEET 1.

WITNESSES:

INVENTOR:
Michele Guglielmo de Simone,
By his Attorneys

No. 809,331. PATENTED JAN. 9, 1906.
M. G. DE SIMONE.
CLUTCH MECHANISM.
APPLICATION FILED APR. 14, 1905.

3 SHEETS—SHEET 2.

UNITED STATES PATENT OFFICE.

MICHELE GUGLIELMO DE SIMONE, OF LONDON, ENGLAND, ASSIGNOR OF THREE-EIGHTHS TO DOMENICO ROBERT DE SIMONE AND ONE-FOURTH TO THE WILKINSON SWORD COMPANY LIMITED, BOTH OF LONDON, ENGLAND.

CLUTCH MECHANISM.

No. 809,331.     Specification of Letters Patent.     Patented Jan. 9, 1906.

Application filed April 14, 1905. Serial No. 255,529.

*To all whom it may concern:*

Be it known that I, MICHELE GUGLIELMO DE SIMONE, mechanical engineer, of 62 Doughty street, London, England, have invented certain new and useful Improvements in Clutch Mechanism, of which the following is a description.

This invention relates to clutch mechanism, and has for its object to provide an efficient clutch easier of manipulation and control than those ordinarily in use, the improved clutch being especially suitable for use in motor-vehicles.

According to this invention a number of hydraulic plungers forming one member of the clutch are so disposed as to engage an eccentric surface on or in the other member of the clutch. When the clutch is required to run free, the liquid-supply to the pistons is allowed to run freely either from one plunger to the other or otherwise, as convenient, so that the eccentric surfaces merely cause the plungers to reciprocate. When the clutch is required to act, the liquid is locked within the cylinders of the plungers, and they are thus held rigidly within or against the eccentric surface, and thereby effectually grip the same, and both members of the clutch rotate together.

The invention will be understood from the following description, by way of example, of its application to a motor-car fly-wheel.

Figure 1:
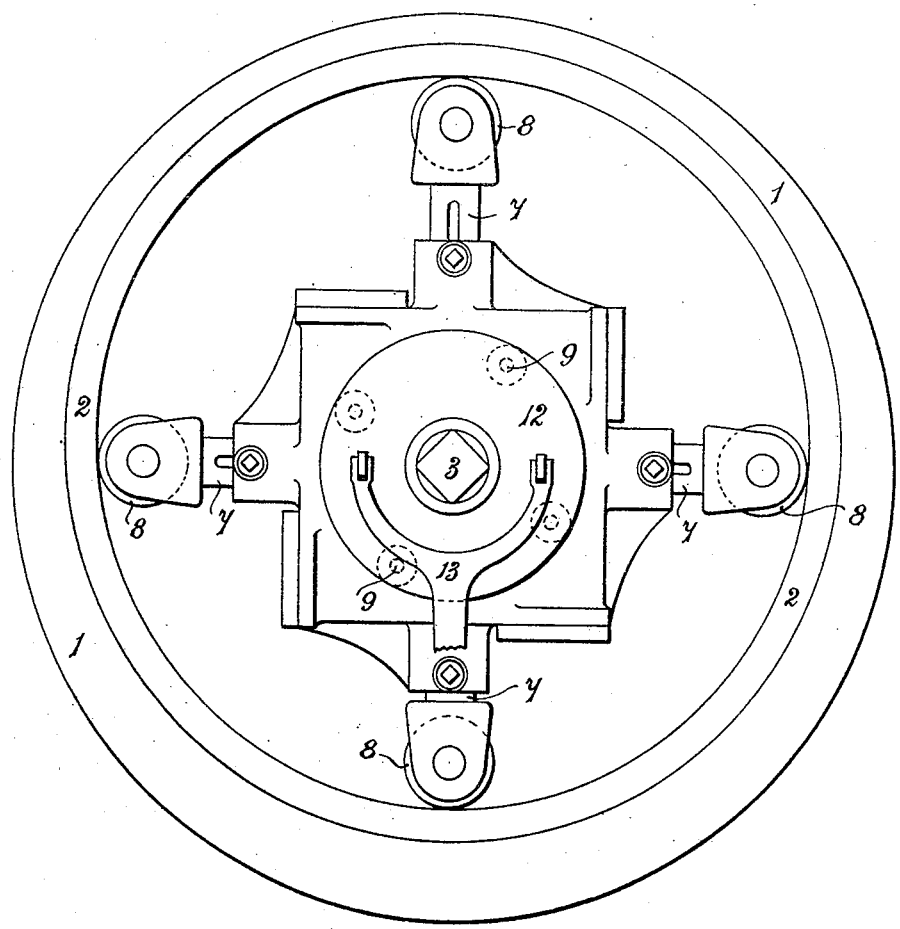
Figure 2:
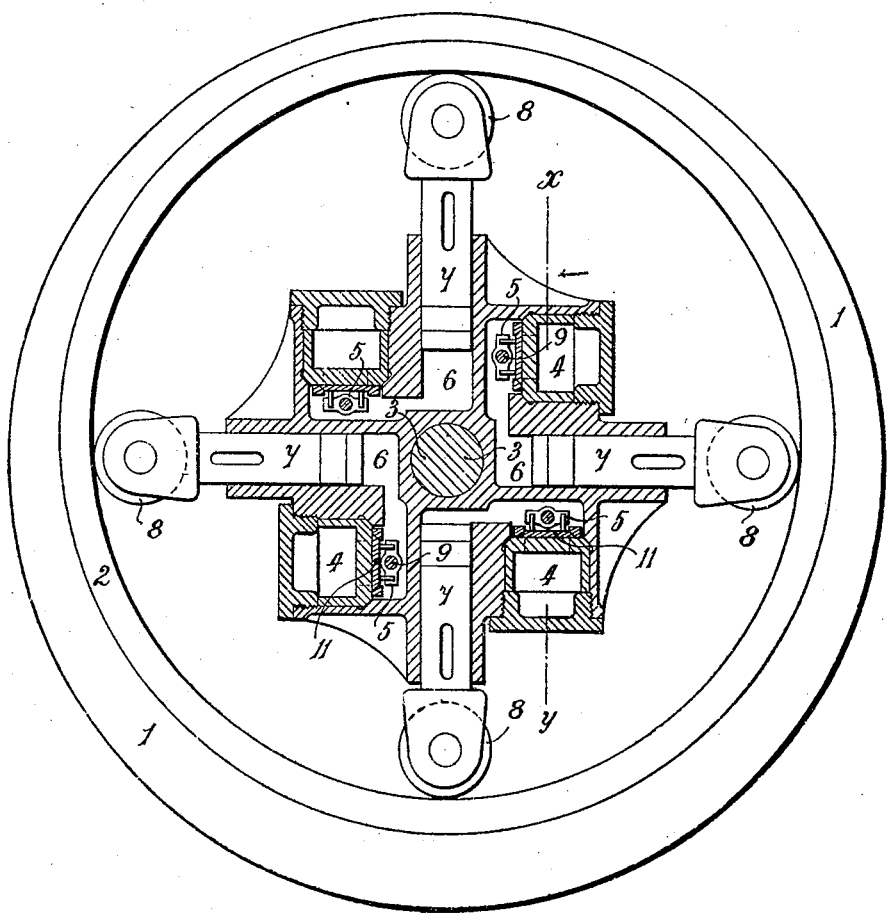
Figure 3:
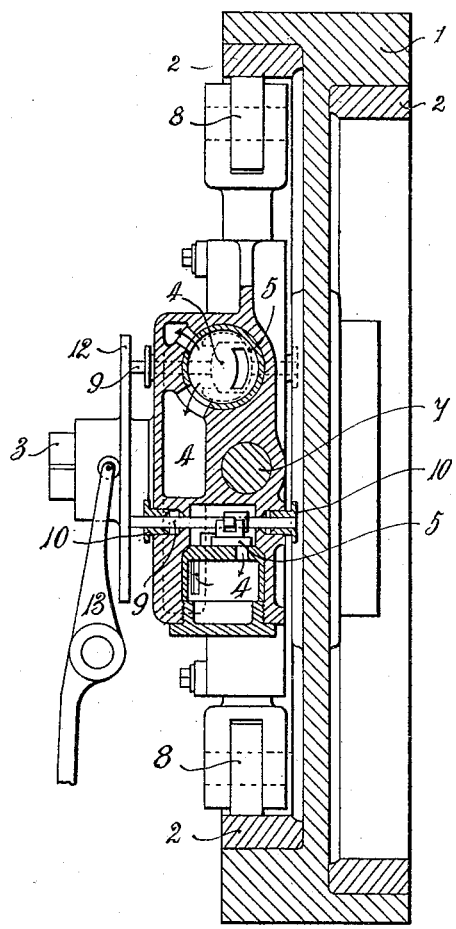

In the drawings, Figure 1 is a face view of the clutch and fly-wheel. Fig. 2 is a similar view to Fig. 1 with the working parts in section, and Fig. 3 is a section of Fig. 2 on the line X Y.

The fly-wheel 1, which constitutes one member of the clutch, is formed with a circular recess 2, which is eccentric to the axis of the fly-wheel 1. The adjoining shaft 3, which runs on an axis in alinement with the axis of the fly-wheel, carries the other clutch member, which comprises a central liquid-chamber 4, supporting and open through suitable valves 5 5 to four radially-disposed cylinders 6, in which reciprocate four plungers 7, carrying antifriction-wheels 8 at their extremities, which engage with and bear against the inner surface of the eccentric circular recess 2.

The valves 5 between the central liquid-chamber 4 and the cylinders 6, are shown in the drawings as slide-valves, these being found most suitable for the purpose, although other valves may be employed, if required. If disk or cone valves are employed, it is preferable to employ a small auxiliary or relief valve therein to insure easier working against the liquid-pressure. The slide-valves 5 are operated by rods 9, passed through suitable stuffing-boxes 10, and the valves are seated on seatings 11, which may be arranged for removal, if required. The valve-spindles 9 extend outward, so as to be operated by external means of any suitable kind. In the drawings the said spindles are shown as operated by a sliding flanged sleeve 12, mounted on the shaft 3 and slid by a pivoted lever 13. Suitable plugs are provided for filling the chamber 4 and cylinders 6 with liquid. The valves 5 may be normally kept open under spring action, or, as shown in the drawings, they may be directly connected to the sliding sleeve 12 and operated back and forth thereby.

In operation the central liquid-chamber 4 and the cylinders 6 in connection therewith are filled with liquid, and the plungers 7 engage with the inner edge of the resess 2 in the fly-wheel 1. On account of the eccentricity of this recess the plunger on one side will be extended, while others of the other side will be retracted. Assuming the valves 5 between the cylinders 6 and the central liquid-chamber 4 to be open and the fly-wheel to be started, the eccentricity of the recess 2 will cause the plungers 7 to be successively retracted and extended as the fly-wheel rotates, the liquid from the piston which is moving inward passing through the valves and chamber 4 to the cylinder, the piston of which is moving outward. In this manner the respective members of the clutch will run free and no power will be transmitted. If now the valves 5 are closed, no liquid can pass between the cylinders and all the plungers 7 will be held and locked in the position in which they happen to be at the time, and by reason of the fly-wheel with the eccentric recess 2 continuing to rotate an effectual driving grip will result by the engagement of the now immovable plungers with the eccentric recess and the two members of the clutch will rotate together. Suitable means will be provided for lubricating the face of the recess 2, and, if required, the outer edges thereof may be flanged to better retain the lubricant.

In modified constructions the motion of the valve may be radial to the axis, and they may be arranged to be kept open by spring action, being pressed outwardly for the purpose.

What I claim, and desire to secure by Letters Patent, is—

1. In a liquid-clutch, the combination of a rotary clutch member having a circular recess eccentric to the axis of rotation, a second clutch member formed with radiating cylinders, plungers in said cylinders, the ends of which engage the inner face of said eccentric recess, a common liquid-chamber in communication with all the cylinders, a separate valve between each cylinder and the common liquid-chamber, and means for operating all the valves to allow the liquid to flow freely between the common liquid-chamber and the cylinders and the plungers to reciprocate in the latter under the action of the eccentric surface of the second clutch member, whereby the clutch will run idle, said means also serving to operate all the valves to close communication between the common liquid-chamber and the cylinders and lock the liquid therein and the plungers in rigid engagement with the eccentric surface of the second clutch member whereby both members are forced to rotate together.

2. In a liquid-clutch, the combination of an outer rotary clutch member having a circular recess eccentric to the axis of rotation, an inner rotary clutch member formed with radiating cylinders, plungers in said cylinders, the ends of which engage the inner face of said eccentric recess, a common liquid-chamber communicating through a separate and independent passage with each cylinder, a separate and independently self-adjusting valve controlling the respective passage between each cylinder and the common liquid-chamber, and means for operating all the valves in unison to allow the liquid to flow freely between the common liquid-chamber and the cylinders and the plungers to reciprocate in the latter under the action of the eccentric surface of the outer clutch member, whereby the clutch will run idle, said means also serving to operate all the valves in unison to close communication between the common liquid-chamber and the cylinders and lock the liquid therein and the plungers in rigid engagement with the eccentric surface of the outer clutch member whereby both members are forced to rotate together.

3. The improved clutch mechanism comprising a rotary clutch member having a circular recess eccentric to the axis of rotation, another rotary clutch member formed with radially-disposed cylinders, plungers in said cylinders, the ends of which engage the inner face of said eccentric recess, a common liquid-chamber in communication with all the cylinders, valves between said cylinders and the common liquid-chamber, means for operating said valves whereby the liquid may be allowed to run freely between the cylinders, and the plungers to reciprocate therein under the action of the eccentric surface of the other member of the clutch, whereby the clutch will run free, said means also serving to operate said valve to close communication between the cylinders and lock the liquid therein and the plungers in rigid engagement with the eccentric surface of the other member of the clutch whereby both members rotate together.

In witness whereof I have hereunto signed my name in the presence of two subscribing witnesses.

MICHELE GUGLIELMO DE SIMONE.

Witnesses:
  HENRY ALLEN PRYER,
  ROBERT MILTON SPEARPOINT.